United States Patent [19]
Vis et al.

[11] Patent Number: 5,712,538
[45] Date of Patent: Jan. 27, 1998

[54] CRT DISPLAY DEVICE COMPRISING A FILTER IN THE CATHODE MODULATOR

[75] Inventors: Petrus N. J. Vis; Rudolf Kemner; Edwin A. Montie; Alfred Ketting; Adriaan J. Hoeven, all of Eindhoven, Netherlands

[73] Assignee: U.S. Philips Corporation, New York, N.Y.

[21] Appl. No.: 577,459

[22] Filed: Dec. 22, 1995

[30] Foreign Application Priority Data

Dec. 22, 1994 [EP] European Pat. Off. .............. 94203719

[51] Int. Cl.$^6$ ........................................ H01J 29/50
[52] U.S. Cl. .................... 315/383; 315/13.1; 348/809; 348/563
[58] Field of Search .................... 315/13.1, 14, 383, 315/382; 348/173, 813, 563, 564, 566, 663, 664, 687, 809

[56] References Cited

U.S. PATENT DOCUMENTS

| | | | |
|---|---|---|---|
| 4,418,359 | 11/1983 | Stapleton | 348/809 |
| 4,855,650 | 8/1989 | Seigneur et al. | 315/383 |
| 4,954,901 | 9/1990 | Okada et al. | 348/809 |
| 5,389,855 | 2/1995 | Chen | 315/14 |
| 5,418,576 | 5/1995 | Ross | 348/589 X |

FOREIGN PATENT DOCUMENTS 2227911  8/1990  United Kingdom.

*Primary Examiner*—Robert Pascal
*Assistant Examiner*—Justin P. Bettendorf
*Attorney, Agent, or Firm*—Robert J. Kraus

[57] ABSTRACT

A phosphor screen in a display device is scanned by separate electron beams in order to generate images of different frequency content in one color in substantially the same part of the phosphor screen. The different images can be perceived as a composite image for some time. The individual electron beams can be modulated by means of a cathode modulator on the basis of a high frequency and a low frequency component of an electronic image signal or on the basis of an image component and a text component of an electronic image signal. The modulations of the individual electron beams may be slightly delayed relative to one another in order to avoid overloading of the phosphor material.

17 Claims, 3 Drawing Sheets

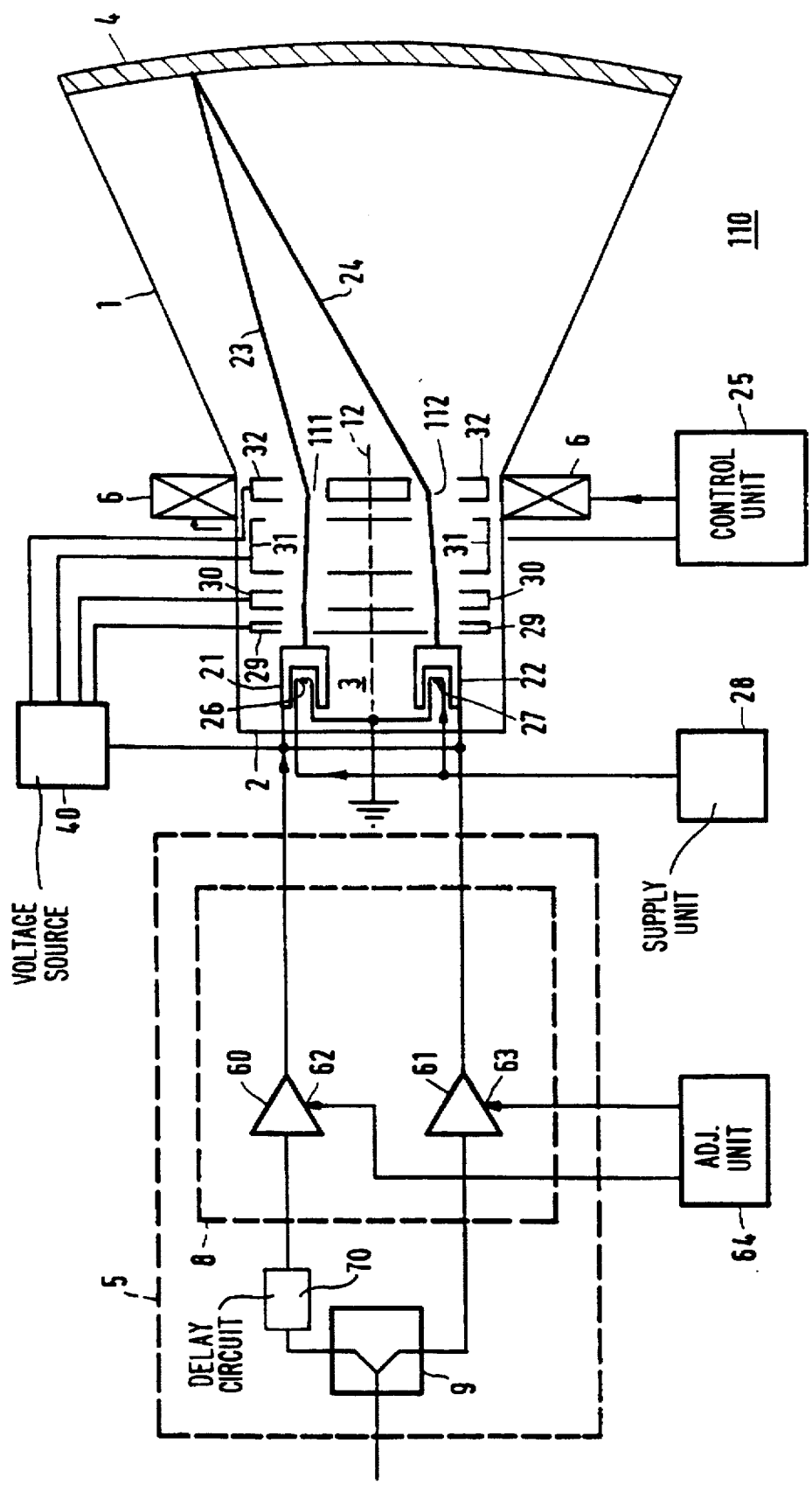

CRT DISPLAY DEVICE COMPRISING A FILTER IN THE CATHODE MODULATOR

BACKGROUND OF THE INVENTION

1. Field of the Invention

This invention relates to a display device, comprising a cathode arrangement for emitting a plurality of electron beams, a phosphor screen which is arranged opposite the cathode arrangement, a cathode modulator for modulating the electron beams on the basis of an electronic image signal, and a deflection system for scanning substantially the same part of the phosphor screen by means of the individual electron beams.

2. Description of the Related Art

A display device of this kind is known from British Patent Application GB 2 227 911 for displaying an image of high brightness. In circumstances in which it is essential that small image details can be suitably observed, it is important not only that the image is displayed with high brightness, but also that small details are displayed with a suitable contrast. When the known display tube is used to display an X-ray image of a patient to be examined, an X-ray image cannot be displayed with a satisfactory diagnostic quality, because medically relevant image information is usually contained in small details with little contrast.

The cathode modulator acts to modulate the intensities of the electron beams emitted by the electron sources. The modulation is carried out on the basis of the electronic image signal, so that the electron beams produce light with brightness variations representing image information in the electronic image signal. The cathode modulator in the known display device is arranged to generate light twice in succession in substantially the same positions on the phosphor screen, using the individual electron beams. The two electron beams generate the same image twice in rapid succession so that overloading of the phosphor material is avoided when an image with high brightness is displayed on the phosphor screen. The cited publication also mentions that the use of separate electron beams instead of a single electron beam offers the advantage that a high brightness of the displayed image is achieved without increasing the intensity of the electron beams to such an extent that accurate deflection is impossible. The known display device allows for an image of high brightness to be displayed sharply, but this does not lead to improved perceptibility of small details with little contrast. The known display device does not contribute to improved image quality by increasing the contrast in the image displayed on the phosphor screen.

SUMMARY OF THE INVENTION

It is an object of the invention to provide a display device, for example, for use in medical diagnostics, for making image information with small details perceptible on the phosphor screen with an increased contrast.

To achieve this, a display device in accordance with the invention is characterized in that the cathode modulator is arranged to modulate the intensity of individual electron beams on the basis of separate spatial components of the image represented by the electronic image signal in order to generate images in said part of the phosphor screen which represent different spatial frequency components of the image form a superposed image.

The individual electron beams are modulated with different frequency components of the electronic image signal and generate, in essentially the same part of the phosphor screen, images which represent separate spatial frequency components of image information contained in the electronic image signal. The individual images can be observed together as a superposed image in which the individual images have been mixed according to an intensification ratio. The respective frequency ranges of the individual frequency components may be separate or may have common frequencies. The intensification ratio is determined by the modulation depths and intensities of the individual electron beams. The intensity of the electron beams is the flux density therein. Superposing the separate images in a suitable ratio enables image information of one frequency component to be reproduced relative to image information of another frequency component in such a manner that contrast of small details in the superposed image is enhanced. The intensification ratio for which optimum contrast enhancement is achieved is dependent on the image information contained in the separate frequency components of the electronic image signal. The intensification ratio may also have the value 1; contrast enhancement is still achieved in that case. Because the image on the phosphor screen is composed by two electron beams of limited intensity, modulated on the basis of separate frequency components, the size of the area around the position whereat the electron beams are aimed remains limited and spreading of the high frequency image information is counteracted. The display device in accordance with the invention is particularly suitable, for example, for the display of a monochrome superposed image. Notably when the display device is used to display a medical X-ray image, it is important to display the image with a high contrast so as to achieve a high diagnostic quality, such images usually being displayed in a single colour. Alternatively, the display device may comprise a colour display tube and, if desired, separate spatial frequency components can be displayed in different colours.

A preferred embodiment of a display device in accordance with the invention is characterized in that the cathode modulator comprises a frequency filter for deriving a spatial high frequency signal component and a spatial low frequency signal component from the electronic image signal, and a drive for modulating the electron beams separately with said high frequency and low frequency signal components.

The composite image is formed on the phosphor screen in that the individual electron beams generate separate images with high frequency and low frequency spatial frequency components, respectively, or separate combinations of such spatial frequency components of the image information in the electronic image signal on the phosphor screen. By modulating the electron beams separately, the components of high frequency and low frequency are mixed in the composite image in conformity with the intensification ratio. Separate high frequency and low frequency components are intensified or attenuated relative to one another in dependence on the respective modulation depths and flux densities of the electron beams. When such a relative intensification or attenuation of the high frequency and low frequency components is suitably chosen, the contrast in the superposed image can be enhanced. Notably small details in the image information, contained in the high frequency component in the electronic image signal, are reproduced with enhanced contrast in the composite image by intensifying the high frequency component relative to the low frequency component.

Furthermore, the display device is independent of the image pick-up device supplying the electronic image signal because the frequency filter is included in the display device.

A preferred embodiment of a display device in accordance with the invention is characterized in that the cathode modulator comprises signal separation means for deriving from the electronic image signal an image component which relates mainly to image information in the electronic image signal and a text component which relates mainly to text information in the electronic image, and also comprises a drive for separately modulating the electron beams with said image component and text component.

This embodiment of the display device is particularly suitable for the display of image information as well as text information which may both be contained in the electronic image signal. The separate electron beams generate a superposed image on the phosphor screen in which image information and text information are simultaneously reproduced.

A further preferred embodiment of a display device in accordance with the invention is characterized in that the cathode modulator comprises a delay circuit for scanning substantially the same positions of the phosphor screen in rapid succession by means of the separately modulated electron beams.

Maximum activation of the phosphor material in said positions by separately modulated electron beams does not take place simultaneously, but in rapid succession. This prevents overloading and saturation of the phosphor material. In the same, or substantially the same, positions on the phosphor screen there is generated an image which is composed of spatial frequency components, succeeding one another in rapid succession, by means of separate electron beams. In order to achieve a desired luminous intensity of the image on the phosphor screen, the required flux density of the individual electron beams is lower than the flux density required for the desired light intensity if the image were generated by means of a single electron beam. Because the flux density in the individual electron beams remains limited, they can be more accurately deflected by the cathode arrangement, in cooperation with the deflection system, so as to be focused on the phosphor screen. Due to the limited flux density, the size of the area around the position whereonto the electron beams are directed remains limited and an image of high spatial resolution is generated on the phosphor screen. The individual electron beams scan the same or substantially the same positions on the phosphor screen and are delayed relative to one another by such a short period of time that the phosphor material still luminesces under the influence of the excitation by the first electron beam when excitation by the next electron beam occurs. The images generated by the individual electron beams are thus visible as a superposed image for some time.

A further preferred embodiment of a display device in accordance with the invention is characterized in that the cathode arrangement is accommodated in a neck of the cathode ray tube, that the cathode arrangement comprises a plurality of electron sources for emitting substantially parallel electron beams, that the cathode arrangement is arranged to guide said electron beams in a converging fashion through separate exit openings of the cathode arrangement, that the exit openings of the cathode arrangement are situated to both sides of an axis of the neck, and that the deflection system is arranged to cooperate with the cathode arrangement so as to direct the converging electron beams to substantially the same positions on the phosphor screen.

The electron beams emanate in parallel from the electron sources, but leave the cathode arrangement in a converging fashion relative to one another, i.e. the electron beams are deflected within the cathode arrangement so that they exhibit a break-point therein. Because the electron beams exhibit a break-point in the cathode arrangement formed, for example, by an integrated cathode with several electron sources, an ion trap is automatically created in the cathode system and the integrated cathode will hardly be subject to contamination by incident ions. Such ions are released in the cathode ray tube, for example, by collisions of residual gas atoms with one of the electron beams and these ions move in the direction of the cathode under the influence of the electromagnetic fields. Because of the much greater mass of the ions, they do not exactly follow the break-point of the electron beams, but land adjacent the electron source situated behind the exit opening so as to be recombined with electrons which are supplied from ground, without the ions having the opportunity to contaminate the cathode material of the electron sources.

These and other aspects of the invention will be described in detail hereinafter on the basis of the following embodiments and the accompanying drawing.

BRIEF DESCRIPTION OF THE DRAWING

The drawing includes the following FIGS:

FIG. 3 shows diagrammatically a further embodiment of a display device in accordance with the invention.

DETAILED DESCRIPTION OF THE PREFERRED EMBODIMENTS

Figure 1:
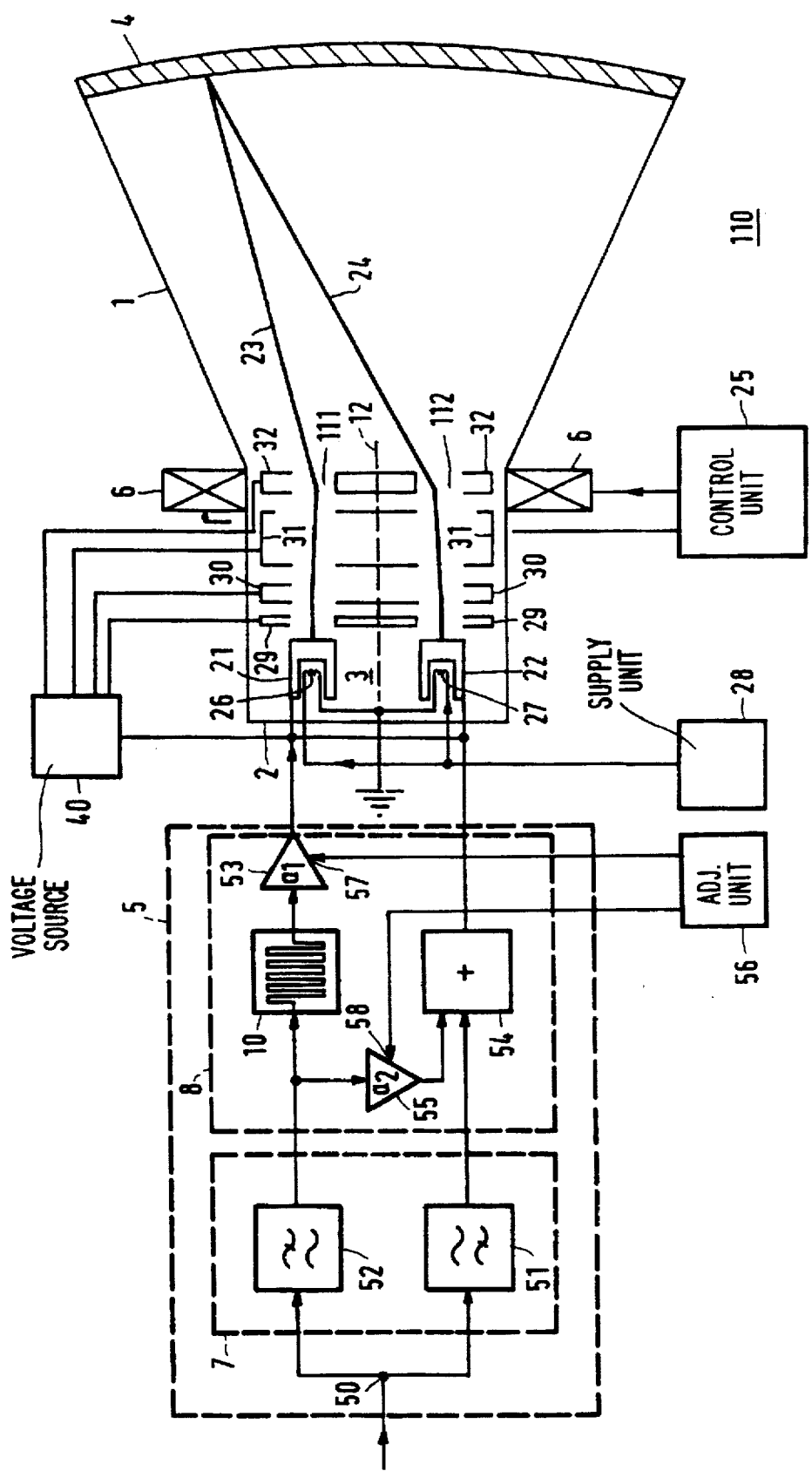
FIG. 1 shows diagrammatically an embodiment of a display device in accordance with the invention.

FIG. 1 shows diagrammatically an embodiment of a display device in accordance with the invention. The cathode ray tube 110 comprises an evacuated envelope 1. In a neck 2 of the envelope there is arranged a cathode arrangement 3. The individual electron sources 21 and 22 comprise respective filaments 26 and 27 which are coupled to a supply unit 28. The two electron sources 21 and 22 emit electron beams 23 and 24 which are directed, by a deflection system 6, onto substantially the same position on a phosphor screen 4 provided opposite the neck 2 inside the envelope 1. The deflection system 6 comprises deflection coils through which an electric current is applied under the control of a control unit 25. By absorption of an electron beam in the phosphor material, light of an intensity which is dependent on the intensity of the electron beam is locally generated in the phosphor screen. The cathode material of the electron sources is heated by applying an electric current through the filaments 26 and 27, with the result that the cathode material emits electrons. The cathode arrangement furthermore comprises a number of electrodes for forming the emitted electrons into electron beams. The electrodes are provided with openings for the passage of the electron beams. In front of the cathodes there is arranged an acceleration electrode 30 whereto an electric cathode voltage of approximately 0.7 kV is applied by a voltage source 40. A grid 29 is arranged between the electron sources 21 and 22 and the acceleration electrode 30. The electron sources 21, 22, the grid 29 and the acceleration electrode 30 operate as a triode and the intensity of the electron beams is controlled on the basis of a small voltage difference of a few tens of volts between the individual electron sources and the grid 29. The cathode arrangement also comprises a focusing electrode 31 and an anode 32, carrying a high voltage of approximately 25 kV, for further acceleration of the electron beams and for focusing these beams on the phosphor screen. The electron beams emanate from the cathode arrangement via exit openings 111 and 112 which are situated to both sides of an axis 12 of the neck 2. The foregoing concerns a comparatively simple embodiment of the cathode arrangement 3 and to those skilled in the art it will be evident that more complex configurations of electrodes can be used in the cathode arrangement, for example, to enhance the properties of the electron beams, if desired. The cathode arrangement can be designed so that the individual electron sources and the electrodes are optimally arranged for precision focusing of electron beams, modulated at different frequencies, onto the phosphor screen.

In the embodiment shown in FIG. 1, the electronic image signal is split into two frequency components whereby two electron sources are modulated. In accordance with the invention it is also possible to use more than two electron sources and to split the electronic image signal into more than two frequency components. The display device in accordance with the invention is attractively constructed so as to comprise a vacuum envelope 1 of a standard colour picture tube. In the neck of such a colour picture tube there is sufficient space to accommodate a cathode arrangement comprising three electron sources. A cathode arrangement comprising two electron sources finds sufficient space in the neck of such a colour picture tube. The dimensions of the electrodes in a cathode arrangement comprising two electron sources may even be chosen so as to be slightly larger than is customary in a standard colour picture tube, the focusing accuracy thus being enhanced.

In order to modulate the intensity of the electron beams, the cathode ray tube 110 comprises a cathode modulator 5 which is coupled to the individual electron sources 21 and 22 of the cathode arrangement 3. The cathode modulator modulates the voltage differences between the grid 29 and the respective electron sources 21, 22. The intensities of the electron beams 23 and 24 are modulated on the basis of the modulation of these voltage differences. The voltage differences between the individual cathodes and the grid are modulated with different components of an electronic image signal presented to a signal input 50 of the cathode modulator. A frequency filter 7, comprising a high-pass channel 51 and a low-pass channel 52, extracts a high frequency component with frequencies higher than 3.5 MHz and a low frequency component with frequencies lower than 4 MHz from the electronic image signal. A delay line 10 and an amplifier 53, adjusted for a first gain $\alpha_1$, delay the low frequency component slightly in time, a few nanoseconds, and amplify it for supply to a first electron source 21. A voltage equal to the amplified and delayed low frequency component is thus superposed on the voltage difference between the grid 29 and the first electron source 21. A second amplifier 55, adjusted for a second gain $\alpha_2$, forms a second amplified low frequency component of the electronic image signal. From the electronic image signal the high-pass channel 51 extracts a high frequency component which is added to the second amplified low frequency component in an adder 54 and the output signal of the adder is applied to the second electron source 22. The amplifications of the high and low frequency components may also constitute attenuations when the relevant amplification is less than 1. An adjusting unit 56 applies control signals to respective control inputs 57 and 58 of the amplifiers 53 and 55 in order to adjust the gains of these amplifiers.

Instead of the cathode modulator, deriving high-frequency low-frequency components from the electronic image signal in order to modulate the electron beam therewith, separate components of an electronic image signal can also be applied to separate electron sources from an image memory. In such an image memory, for example, being of 3 digital type, separate components of an image can be stored. For example, high-frequency and low-frequency components of an image can be stored. For example, high-frequency and low-frequency components of an image can be separately stored in said image memory.

The electron source 21 emits an electron beam which scans substantially the entire phosphor screen and generates an image thereon with the low frequency image information in the electronic image signal. The electron beam emitted by the electron source 22 also scans substantially the entire phosphor screen and generates an image thereon which is a superposition of high frequency and low frequency image information in the electronic image signal. The phosphor screen is preferably a monochromatic phosphor screen of a material emitting light of essentially one colour by absorption of electrons. Even though the modulation of the one electron source 21 is slightly delayed relative to the modulation of the other electron source 22 in the embodiment shown, the delay is so short that the images produced by the individual electron beams can be observed as one superposed image. In this composite image the ratio of the high frequency and low frequency image components deviates from the ratio of the high frequency and low frequency components in the electronic image signal on the input of the cathode modulator. For example, in the composite image the spatial high frequency components of the image have been intensified relative to the low frequency image, so that small details are more clearly reproduced in the composite image. When image information of an X-ray image of a patient to be examined is displayed by means of the cathode ray -tube 110, the image information is displayed with a high diagnostic quality because notably small details which are of importance in detecting deviations in the anatomy are clearly reproduced. The radiologist can thus more readily perceive such details.

Overloading of the phosphor material is counteracted by delaying the low frequency modulation of the electron beam 23 relative to the modulation of the electron beam 24 which also includes a high frequency modulation. Moreover, the delay reduces interactions between the modulations of the individual electron beams.

In a special case the first and the second gain are adjusted so that their sum amounts to 1, so that the complete image information in the electronic image signal is applied to the cathode modulator. Even though the ratio of the frequency components in the image displayed is the same as in the electronic image signal for this special setting, the display is improved nevertheless. Because the image on the phosphor screen is composed by means of two electron beams of limited intensity, the size of the area around the position whereonto the electron beams are directed remains limited and spreading of the high frequency image information is counteracted.

Figure 2:
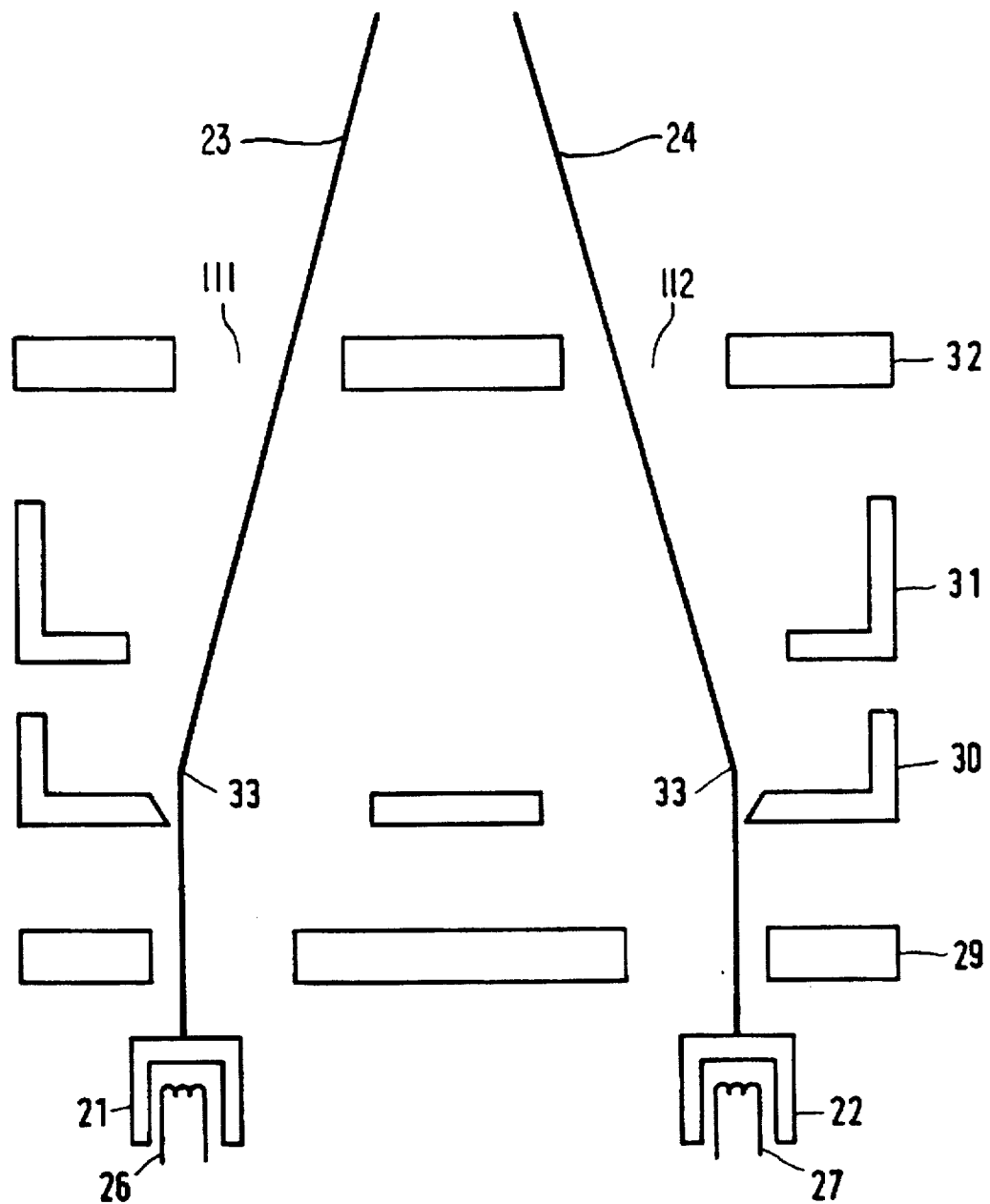
FIG. 2 shows diagrammatically a cathode arrangement of a display device in accordance with the invention.

FIG. 2 shows diagrammatically a cathode arrangement of a display device in accordance with the invention. The individual electron beams 23 and 24 emanating from the respective electron sources 21 and 22 initially follow approximately parallel paths. The electrodes 29, 30 and 31 of the cathode arrangement are formed so that, due to the field generated by the electrons, the electron beams of individual electron sources converge relative to one another within the cathode arrangement, i.e. the electron beams are directed towards one another. The electron beams 23 and 24 which converge from the exit openings 111 and 112 are directed onto substantially the same positions on the phosphor screen by the deflection system. A deflection system which suitable to direct individual electron beams accurately onto substantially the same positions on the phosphor screen is disclosed in detail in the published European Patent Applications EP 0 516 229 and EP 0 655 766. Because the electron beams already converge within the cathode arrangement and do not extend along the axis of the neck 2, the paths of the electron beams within the cathode arrangement exhibit a break-point 33. Ions released, for example, by collision with residual gas atoms tend to move towards the electron sources in the cathode arrangement; However, because the ions cannot follow the break-point in the electron path because of their large mass, they will not enter the electron sources, contamination of the cathode material of the electron sources thus being counteracted.

FIG. 3 shows diagrammatically a further embodiment of a display device. This embodiment is particularly suitable for use when the electronic image signal contains image information as well as text information. The electronic image signal is applied to signal separation means 9 which derive an image component and a text component from the electronic image signal. Both components are applied to the drive 8 and each component is separately amplified by respective amplifiers 60 and 61. The component from signal separation means 9 which is applied to amplifier 60 passes through a delay circuit 70. Separate electron beams 23 and 24 are modulated with amplified image components and text components. These electron beams are used to display image and text information together on the phosphor screen. An adjusting unit 64 applies control signals to control inputs 62 and 63 of the respective amplifiers in order to adjust their gains. The modulation depths of the individual electron beams are adjusted for display of image and text with the desired intensity ratio by adjustment of said gains. As an alternative, when separate electron beams are used to display text and image information, it may be attractive to scan different parts of the phosphor screen by means of the individual electron beams. Image information in medical X-ray diagnostics is usually reproduced in a circular central zone of the approximately rectangular phosphor screen, whereas the zones in the corners of the phosphor screen, outside the central zone, are often used to display text. By realizing the display of image information in the central zone by means of individual electron beams, a high-contrast display with suitable sharpness is achieved, because convergence errors between the individual electron beams remain limited in the central zone. The text can be reproduced in the corner zones by means of a single electron beam. Problems in respect of focusing of the electron beams, occurring when the electron beam is directed to the corner zones, do not cause unsharpness in the reproduction of the text, because the text is reproduced by means of a single electron beam. The maximum brightness of the display of text is somewhat limited when the display is realized by means of a single electron beam, but a high brightness is not very important for satisfactory display of text.

We claim:

1. A display device, comprising:

a cathode arrangement for emitting a plurality of electron beams, a phosphor screen which is arranged opposite the cathode arrangement, a cathode modulator for modulating the electron beams on the basis of an electronic image signal, a deflection system for scanning substantially the same part of the phosphor screen by means of the individual electron beams, wherein the cathode modulator is arranged to modulate the intensity of individual electron beams on the basis of separate spatial components of the image represented by the electronic image signal in order to generate images in said part of the phosphor screen which represent different spatial frequency components of the image, and the cathode modulator comprises a frequency filter for deriving a spatial high-frequency signal component and a spatial low frequency signal component from the electronic image signal, and a drive for modulating the electron beams separately with said high-frequency and low frequency signal components, and said images form a superposed image.

2. A display device as claimed in claim 1, wherein the cathode modulator comprises a delay circuit for scanning substantially the same positions of the phosphor screen in rapid succession by means of the separately modulated electron beams.

3. A display device as claimed in claim 2, wherein:

the cathode arrangement is accommodated in a neck of the cathode ray tube, the cathode arrangement comprises a plurality of electron sources for emitting substantially parallel electron beams, the cathode arrangement is arranged to guide said electron beams in a converging fashion through separate exit openings of the cathode arrangement, and the deflection system is arranged to cooperate with the cathode arrangement so as to direct the converging electron beams to substantially the same positions on the phosphor screen.

4. A display device as claimed in claim 1, wherein:

the cathode arrangement is accommodated in a neck of the cathode ray tube, the cathode arrangement comprises a plurality of electron sources for emitting substantially parallel electron beams, the cathode arrangement is arranged to guide said electron beams in a converging fashion through separate exit openings of the cathode arrangement, and the deflection system is arranged to cooperate with the cathode arrangement so as to direct the converging electron beams to substantially the same positions on the phosphor screen.

5. A display device, comprising:

a cathode arrangement for emitting a plurality of electron beams, a phosphor screen which is arranged opposite the cathode arrangement, a cathode modulator for modulating the electron beams on the basis of an electronic image signal having an image component which relates mainly to image information in the electronic image signal and a text component which relates mainly to text information in the electronic image, wherein the cathode modulator comprises:

signal separation means for deriving from the electronic image signal said image component and said text component, and a drive for separately modulating the electron beams with said image component and text component.

6. A display device as claimed in claim 5, wherein the cathode modulator comprises a delay circuit for scanning substantially the same positions of the phosphor screen in rapid succession by means of the separately modulated electron beams.

7. A display device as claimed in claim 6, wherein:

the cathode arrangement is accommodated in a neck of the cathode ray tube, the cathode arrangement comprises a plurality of electron sources for emitting substantially parallel electron beams, the cathode arrangement is arranged to guide said electron beams in a converging fashion through separate exit openings of the cathode arrangement, and the deflection system is arranged to cooperate with the cathode arrangement so as to direct the converging electron beams to substantially the same positions on the phosphor screen.

8. A display device as claimed in claim 5, wherein:

the cathode arrangement is accommodated in a neck of the cathode ray tube, the cathode arrangement comprises a plurality of electron sources for emitting substantially parallel electron beams, the cathode arrangement is arrangement is arranged to guide said electron beams in a converging fashion through separate exit openings of the cathode arrangement, and the deflection system is arranged to cooperate with the cathode arrangement so as to direct the converging electron beams to substantially the same positions on the phosphor screen.

9. A display device as claimed in claim 5 wherein said drive modulates one electron beam with said image component and separately modulates a second electron beam with said text component.

10. A display device, comprising:

a cathode arrangement for emitting a plurality of electron beams, a phosphor screen which is arranged opposite the cathode arrangement, a cathode modulator for modulating the electron beams on the basis of an electronic image signal, a deflection system for scanning substantially the same part of the phosphor screen by means of the individual electron beams, wherein the cathode modulator derives a spatial high-frequency signal component of the image represented by the electronic image signal and the cathode modulator modulates the intensity of the individual electron beams on the basis of separate spatial components of the image represented by the electronic image signal in order to generate images in said part of the phosphor screen which represent different spatial frequency components of the image, one of said spatial frequency components of the image corresponds to said spatial-high-frequency component of the electronic image signal, and said images form a superposed image.

11. A display device as claimed in claim 10, wherein the cathode modulator comprises a delay circuit for scanning substantially the same positions of the phosphor screen in rapid succession by means of the separately modulated electron beams.

12. A display device as claimed in claim 11, wherein:

the cathode arrangement is accommodated in a neck of the cathode ray tube, the cathode arrangement comprises a plurality of electron sources for emitting substantially parallel electron beams, the cathode arrangement is arranged to guide said electron beams in a converging fashion through separate exit openings of the cathode arrangement, and the deflection system is arranged to cooperate with the cathode arrangement so as to direct the converging electron beams to substantially the same positions on the phosphor screen.

13. A display device as claimed in claim 10, wherein:

the cathode arrangement is accommodated in a neck of the cathode ray tube, the cathode arrangement comprises a plurality of electron sources for emitting substantially parallel electron beams, the cathode arrangement is arranged to guide said electron beams in a converging fashion through separate exit openings of the cathode arrangement, and the deflection system is arranged to cooperate with the cathode arrangement so as to direct the converging electron beams to substantially the same positions on the phosphor screen.

14. A display device as claimed in claim 10 wherein the cathode arrangement emits only two electron beams.

15. A display device as claimed in claim 10, wherein the cathode modulator comprises:

a frequency filter for deriving a spatial low frequency signal component from the electronic image signal, and a drive for modulating the electron beams separately with said high-frequency and low frequency signal components.

16. A display device as claimed in claim 15, wherein the cathode modulator comprises a delay circuit for scanning substantially the same positions of the phosphor screen in rapid succession by means of the separately modulated electron beams.

17. A display device as claimed in claim 15, wherein:

the cathode arrangement is accommodated in a neck of the cathode ray tube, the cathode arrangement comprises a plurality of electron sources for emitting substantially parallel electron beams, the cathode arrangement is arranged to guide said electron beams in a converging fashion through separate exit openings of the cathode arrangement, and the deflection system is arranged to cooperate with the cathode arrangement so as to direct the converging electron beams to substantially the same positions on the phosphor screen.

* * * * *